J. W. HUGHES.
METHOD OF MAKING CHAIN LINKS.
APPLICATION FILED DEC. 9, 1913.
1,166,460.
Patented Jan. 4, 1916.
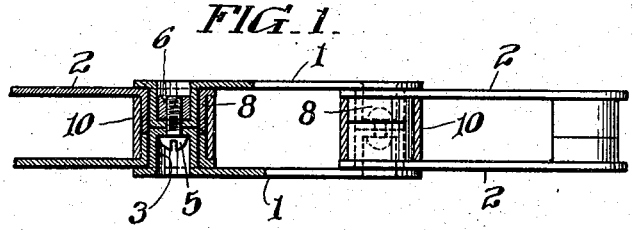
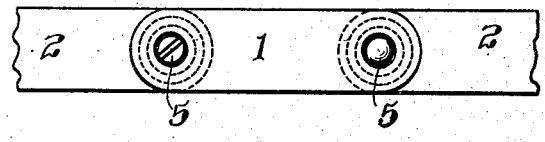
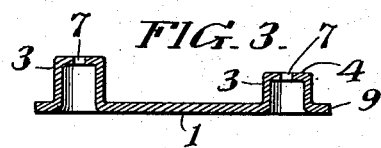
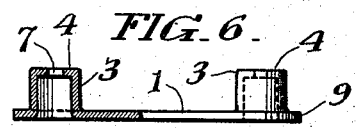
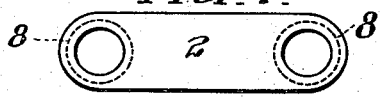
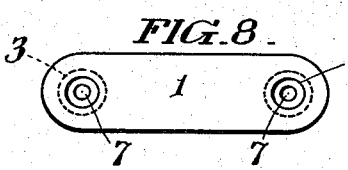
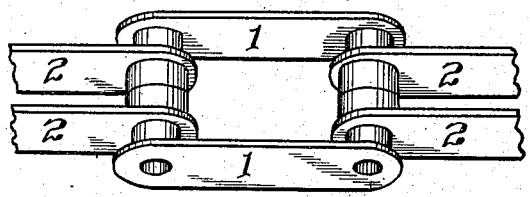
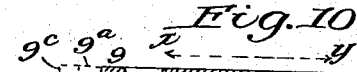
Witnesses
Daniel Webster, Jr.
E. W. Smith
Inventor
James W. Hughes
By
Attorney
COLUMBIA PLANOGRAPH CO., WASHINGTON, D. C.

UNITED STATES PATENT OFFICE.

JAMES W. HUGHES, OF NARBERTH, PENNSYLVANIA.

METHOD OF MAKING CHAIN-LINKS.

1,166,460.   Specification of Letters Patent.   Patented Jan. 4, 1916.

Application filed December 9, 1913. Serial No. 805,500.

*To all whom it may concern:*

Be it known that I, JAMES W. HUGHES, citizen of the United States, and resident of Narberth, county of Montgomery, and State of Pennsylvania, have invented an Improvement in the Method of Making Chain-Links, of which the following is a specification.

This invention relates to a chain structure, and more particularly to a chain, the links of which are respectively formed of sheet steel or other ductile metal having laterally extending tubular hubs stamped and specially drawn therefrom which are adapted to telescope with substantially similarly constructed hubs of adjacent links and also form spacing elements between the opposite side bars of the link members.

The object of my invention is to provide a chain structure which is strong, durable, light and inexpensive to construct, and wherein the longitudinal bars of the link members are not stretched and hence retain their maximum tensile strength, and the tubular and hub portions at the ends of the bars are stretched and compressed and thereby increase their transverse and torsional resistance and also provide increased resistance to wear.

My invention consists of certain constructions of a complete chain, and also of the link sections which are fully described hereinafter and more specifically defined in the claims.

Referring to the drawings: Figure 1 represents a plan partly in section of a portion of a chain structure embodying my invention; Fig. 2 represents a side elevation of the same; Fig. 3 represents a sectional view of one form of outer link; Fig. 4 represents a perspective of one of the roller bearings; Fig. 5 represents an edge elevation partly in section of another form of the outer links; Fig. 6 represents a similar elevation of one of the inner links; Fig. 7 represents a side elevation of the links shown in Figs. 3 and 5; Fig. 8 represents a side elevation of the link shown in Fig. 6; Fig. 9 represents a perspective view showing the links in position to be telescoped to assembled condition and Fig. 10 is a longitudinal section illustrating the manner in which the hubs are drawn out of the sheet without stretching the bar portions.

In the drawings similar numerals of reference indicate corresponding parts.

The chain embodying the construction of my invention is made up of a plurality of links, each of which is stamped out of sheet metal or other structural ductile metal through the medium of properly constructed dies so that the parts are accurately formed and may be interchanged one with another. In the present instance the link structures of the chain are formed of side bars arranged in pairs, as shown in Fig. 1, wherein 1 designates the outer side bars of alternate links and 2 designates the inner pair of side bars of the remaining links, the distinction being thus made because of the fact that I have preferred the alternate pairs of side bars 1 to receive the ends of the intermediate link side bars 2, as will be apparent. Each of the side bars 1 is provided with a plurality of hubs 3, one adjacent each end thereof, the said hubs being tubular in form, and having a contact face 4 adapted to abut and bear against a similar face on the hub of the opposite side bar, the two hubs, and therefore the side bars, being secured together to form a complete link by means of a bolt 5 and nut 6, the former passing through a suitable aperture 7 in the respective hubs 3. It will be noted in the assembled condition of the chain as shown in Fig. 1, that this clamping or fastening device is entirely located within the tubular hubs and has no projections or parts extending laterally of the chain, and therefore the side portions of the chain are entirely free from obstructing parts. It will be manifest that for cheapness the hubs 3 may be riveted together in place of using the more costly bolts 5, 6, for the greater portion of the length of the chain. Such rivets are indicated at 5ᵃ in Fig. 1 and may be employed throughout the chain except where the ends are joined, at which place the bolt 5, 6, is employed for making the union of the links.

The side bars 2 are each provided with annular hubs 8, one adjacent each end thereof, and the inner diameter of said hubs is so proportioned with respect to the outer diameter of the hubs 3, that the latter may be inserted and have an accurate bearing fit within the respective hubs 8. Preferably one of the hubs 8 of each of the side bars 2 is longer than the abutting hub of the opposite side bar so that the joint between these two parts is broken with respect to the joint between the inclosed hubs 3, thereby giving added strength and distributing the strain.

In Fig. 3 I have shown the hubs 3 of each of the side bars 1 of different lengths, and each bar therefore may be provided with a short hub and a long hub, the arrangement being such that in assembled condition of the chain the joints between each pair of side bars 1 are not only staggered with respect to the joints between the pairs of bars 2, but also with respect to the end joints of the same side bars.

In connection with the hub construction of the respective side bars it will be noted in forming each hub that the remaining metal encircling the base of the hub forms an annular flange 9, thereby giving additional strength against distortion of the tubular hubs and also constituting retaining shoulders or walls for the ends of the rollers 10, which may be used, if desired, about the hub construction to provide a suitable wearing surface at this point, and which also serve the purpose of a roller bearing construction. Furthermore, the use of a sleeve or roller of this construction prevents dirt from working in between the hub of the two sets of links, thereby increasing the life of the chain and also taking the greater part of the wear. It will be apparent that these rollers may be readily replaced if broken or worn, which is a material advantage.

In the making of the respective link sections they are each stamped from a strip of sheet steel or material of like ductile nature, and the entire operation may be done at one and the same time if so desired.

To enable a clear understanding of the manner in which the link sections are formed, wherein the bar portions between the hubs are not stretched during the formation of the hubs, and considering the solid sectioned portion of Fig. 10 as comprising the bar portion 1 the flange portion 9 and the hub portion 3 as that of the finished link section (except for the small hole in the bottom part $4^b$), an intermediate step in the drawing operation is indicated by the dotted lines. Assuming, first, that the sheet extended in the plane of the bar portion 1 out to the dotted end $9^c$, and assuming, furthermore, that the dies held the bar portion 1 from $x$ to $y$ in a firm manner but permit the metal at the end $9^c$ to be shifted toward the part 1, it will be understood that when the first drawing operation takes place the sheet is bent adjacent to the ends of the bar 1 downward and the edge of the sheet $9^c$ is drawn into the position $9^a$. The hub $3^a$ of larger diameter than the finished hub is formed with a bottom portion $4^a$ of greater area than in the finished hub $4^b$. It will be noted that the hub portions $3^a$ are formed by the bending of the metal at the end of the bar 1 but without drawing any of the metal from the said bar. Considering now that a second drawing operation is performed to deepen the hub and reduce its diameter, the said hub is then brought down to the depth indicated by the hub 3 and of a smaller diameter as indicated by the part $4^b$, and the flanged end $9^a$ has then been drawn into the position of 9. There may be, of course, as many drawing operations as desired, two being indicated by way of example. It will thus be clearly seen that all of the metal which goes to make up the hub portions has been taken from the sheet beyond the part which constitutes the bar 1, so that said bar 1 is composed of the metal in its natural unstretched condition, whereas, on the other hand, the hub is formed of the metal in stretched and densified form which, while reducing its tensile strength, puts it in better condition for the wear which it is required to sustain. The bar 1, on the other hand, retains its full tensile strength. While the links shown are provided with a hub at each end, it is manifest that this process of forming the link sections is applicable to chain links in which a hub so formed is only on one end, and I therefore do not restrict myself to a double hub link.

The respective hubs 3 and 8 are drawn out of the side bars and the surrounding area or portion adjacent the hub, except on the bar between the hubs, gives up sufficient material to allow the hub to be extended to the full lateral extent required, and it will furthermore be noted that this drawing action is accomplished without reducing the thickness of the metal to any material extent less than the thickness of the link bar itself. In the case of the hubs 8 the ends are stamped out so as to be open to receive the hubs 3 in the assembled chain.

The tubular hub portions on each of the links, owing to the drawing action by means of which they have been formed, are exceedingly dense and consequently well adapted to withstand the wear of oscillation when in use, and have increased shear and torsional resistance. The metal of the bars is not stretched and hence they retain all of their tensile strength. All of the metal for forming the hubs is drawn down from the sheet beyond the ends of the bar portions. Moreover, all of the parts being made of steel, they may be properly tempered by any of the inexpensive processes which are carried out and well known in the manufacturing trade.

While I have described the preferred construction as having one or the other of the pairs of side bars arranged with staggered joints, I wish it understood that I do not desire to be limited to this exact construction, as satisfactory results may be obtained by having the hubs of the same length so that the joints between the respective pairs of hubs are in strict alinement, and I have therefore, in Fig. 5, shown one of the links 2 as having its hubs 8 of the same length.

A chain of the general construction herein shown is exceedingly light, inexpensive and durable; and moreover is easily assembled by telescoping one hub with another, and may be made of the very highest grade of steel, permitting tempering to any degree found necessary or desirable.

An important and essential feature of the improvements lies in the forming of the link sections with hubs thereon which are integral with the metal of the side bar sections, certain of which hubs have abutting faces giving alinement and stability to the structure and at the same time serve as spacing elements for maintaining the side bars at the proper distance apart. Of course, it will be understood as before stated that, if desired, the bolt fastening device shown in Fig. 1 need not be employed for all of the links of the chain, but in place thereof certain of the link elements may be riveted together and the removable fastening devices only utilized at suitable intervals or portions of the chain, as will be understood.

As far as I am aware, no chain has heretofore been formed of sheet metal links each composed of side bars of non-stretched sheet metal having lateral tubular hubs at its ends formed of metal drawn from the sheet metal beyond the ends of the bars and subjected to densification to increase the wearing and torsional resistance, and I therefore do not restrict myself to the particular configuration or shape of the link members or the minor details shown, as my invention comprehends the general construction of a chain formed of assembled sheet metal links of the character stated.

Having thus described my invention, what I claim and desire to secure by Letters Patent is:—

1. The hereindescribed method of forming a link member for a chain from sheet metal, consisting in holding a given length of the sheet metal in quiescent and non-stretchable state, and simultaneously therewith stamping and drawing at opposite ends of the said quiescent metal extended portions of said sheet metal and drawing the mass of the metal toward the quiescent portion of the sheet to produce transverse tubular hub portions wholly to one side of the plane of the quiescent portion, the metal forming the said hub portions being drawn from the portions of the sheet surrounding the hubs except on the side adjacent to the quiescent portion of the sheet, whereby the bar between the hubs is maintained in normal condition without stretching to provide the maximum thickness and tensile strength, and the metal of the hub portions is stretched, drawn and compressed to densify the metal to increase the wearing and torsional resistance of the metal.

2. The herein described method of forming the end of a sheet metal link member for a chain, consisting in holding a given length of sheet metal in a quiescent and non-stretchable state and simultaneously therewith stamping and drawing the metal of the sheet immediately beyond the portion held in quiescent non-stretchable state into a transversely arranged tubular hub portion adjacent to the end of said quiescent non-stretchable portion, the metal forming the said hub portion drawn from the portion of the sheet wholly beyond the quiescent non-stretchable portion, whereby the metal of the link up to the transverse hub portion is maintained in normal condition without stretching to retain its full tensile strength and the metal of the hub portion is stretched, drawn and compressed to densify the metal to increase the wearing and torsional resistance of the metal.

3. A link section for a chain consisting of a side bar of sheet metal in natural unstretched condition throughout its entire length and having at its ends an outwardly extending annular integral flange in the plane of the bar and a lateral tubular hub, the latter consisting wholly of metal of stretched and densified structure and directly connected integral with the flange and unstretched and undensified bar, the metal of the hubs and flanges being alone stretched and densified.

In testimony of which invention, I hereunto set my hand.

JAMES W. HUGHES.

Witnesses:
R. M. Hunter,
E. W. Smith.

Copies of this patent may be obtained for five cents each, by addressing the "Commissioner of Patents, Washington, D. C."